US012662043B2

(12) United States Patent
Pan et al.

(10) Patent No.: US 12,662,043 B2
(45) Date of Patent: Jun. 23, 2026

(54) MULTILINK SLIDE-OUT CABIN STABILIZING STRUCTURE

(71) Applicant: A&C FUTURE, INC., Irvine, CA (US)

(72) Inventors: Qiyin Pan, Irvine, CA (US); Jiuqi Wang, Santa Ana, CA (US); Shoue Chen, Irvine, CA (US); Han Qin, Newport Beach, CA (US); Jiayang Qin, Newport Beach, CA (US)

(73) Assignee: A&C FUTURE, INC., Irvine, CA (US)

( * ) Notice: Subject to any disclaimer, the term of this patent is extended or adjusted under 35 U.S.C. 154(b) by 323 days.

(21) Appl. No.: 18/617,437

(22) Filed: Mar. 26, 2024

(65) Prior Publication Data

US 2025/0303951 A1      Oct. 2, 2025

(51) Int. Cl.
B60P 3/34        (2006.01)

(52) U.S. Cl.
CPC ..................................... B60P 3/34 (2013.01)

(58) Field of Classification Search
CPC ... B60P 3/34; B60S 9/02; B60C 23/78; B60C 23/80; E02F 9/085
See application file for complete search history.

(56) References Cited

U.S. PATENT DOCUMENTS

| | | | |
|---|---|---|---|
| 4,084,789 A | 4/1978 | Francis | |
| 4,708,362 A | 11/1987 | Raetz | |
| 6,095,474 A | 8/2000 | Arnold | |
| 6,142,488 A | 11/2000 | Orr | |
| 6,345,854 B1 * | 2/2002 | McManus ................. | B60P 3/34 |
| | | | 296/165 |
| 6,428,073 B1 * | 8/2002 | Blodgett, Jr. ............. | B60P 3/34 |
| | | | 296/26.14 |
| 6,536,821 B1 * | 3/2003 | Gardner .................... | B60P 3/34 |
| | | | 296/26.14 |
| 7,258,389 B2 * | 8/2007 | Franzini ................... | B60P 3/34 |
| | | | 296/156 |
| 8,356,797 B1 | 1/2013 | Searer et al. | |
| 9,394,667 B2 * | 7/2016 | Lotti ......................... | B60S 9/02 |
| 2018/0170467 A1 | 6/2018 | Fleischhacker et al. | |

* cited by examiner

*Primary Examiner* — Lori Lyjak
(74) *Attorney, Agent, or Firm* — INNOVATION CAPITAL LAW GROUP, LLP; Vic Lin

(57)        ABSTRACT

A multilink structure provides for a stabilizer system for an expansion section of an expandable structure, such as for a slide-out of a recreational vehicle. The stabilization system can be securely mounted onto either the chassis or the extension track, offering versatility for different configurations. Due to space constraints on the chassis, the stabilizer is engineered to remain horizontally aligned when retracted, maximizing available space. The primary connection point for the multilink stabilizer system is the chassis structure, with the outer wall attached as a secondary support. During deployment, the outer wall ingeniously combines pushing and rotational forces to smoothly extend the stabilizer assemblies outward. Once fully extended, the stabilizer adopts a fully vertical position, providing vital stability and support for the expansion section or slide-out. The stabilization system can eliminate the need for manual adjustment and alignment, thereby offering users a seamless and hassle-free experience.

20 Claims, 11 Drawing Sheets

MULTILINK SLIDE-OUT CABIN STABILIZING STRUCTURE

BACKGROUND OF THE INVENTION

1. Field of the Invention

Embodiments of the invention relate generally to expansion structure stabilization. More particularly, embodiments of the invention relate to a stabilizing structure for a slide-out portion of an expandable structure, such as a recreational vehicle.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Traditionally, slide-out structures have been reliant on jack stands for support, with these stands directly bearing the load of the track or other structural components. However, this conventional approach necessitates manual intervention and precise alignment. Further, after the slide-out is deployed, the user must place and elevate the conventional jack stand. When the user is ready to leave the site and bring the slide-out back in, they must first lower the jack stand and store the jack stand in an appropriate location.

In view of the foregoing, there is a need for a system for stabilizing a slide-out structure that does not require manual deployment or additional separate storage space.

SUMMARY OF THE INVENTION

Embodiments of the present invention aim to solve the aforementioned problems in conventional expansion structures by providing a stabilization system that can automatically deploy during expansion of the expansion structure.

Embodiments of the present invention provide a stabilization structure for a deployed expansion structure of an expandable structure comprising a multilink stabilizer assembly having a first support beam attached to a main structure at a proximate end of the first support beam, a second support beam having a proximate end pivotable about a vertical axis at a distal end of the first beam, a first push arm and a second push arm, wherein the first and second push arms are operable to move an actuator assembly between a horizontal position, when the expansion structure is in a retracted state, to a vertical position, when the expansion structure is in a fully expanded state.

Embodiments of the present invention provide a stabilization structure for a deployed expansion structure of an expandable structure comprising a multilink stabilizer assembly having a first support beam attached to a main structure at a proximate end of the first support beam, a second support beam having a proximate end pivotable about a vertical axis at a distal end of the first beam, a first push arm, a second push arm and a connector, wherein the connector extends from the second support beam to attach to an outer wall of the expansion structure; the first and second push arms are operable to move an actuator assembly between a horizontal position, when the expansion structure is in a retracted state, to a vertical position, when the expansion structure is in a fully expanded state; a first end of the first push arm is pivotably attached to the first support beam; a second end of the first push arm is interconnected with a first end of the second push arm; the second end of the second push arm is pivotably attached to an upper end of the actuator assembly; and the actuator assembly pivots about a horizontal pivot axis between an outer support beam body and an inner support beam body of the second support beam.

Embodiments of the present invention provide a stabilization structure for a deployed expansion structure of an expandable structure comprising a multilink stabilizer assembly having a first support beam attached to a main structure at a proximate end of the first support beam, a second support beam having a proximate end pivotable about a vertical axis at a distal end of the first beam, a first push arm and a second push arm, wherein the first and second push arms are operable to move an actuator assembly between a horizontal position, when the expansion structure is in a retracted state, to a vertical position, when the expansion structure is in a fully expanded state; a first end of the first push arm is pivotably attached to the first support beam; a second end of the first push arm is interconnected with a first end of the second push arm; the second end of the second push arm is pivotably attached to an upper end of the actuator assembly; and the multilink stabilizer assembly fits into an opening formed in the main structure when the expansion structure is in the retracted state.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
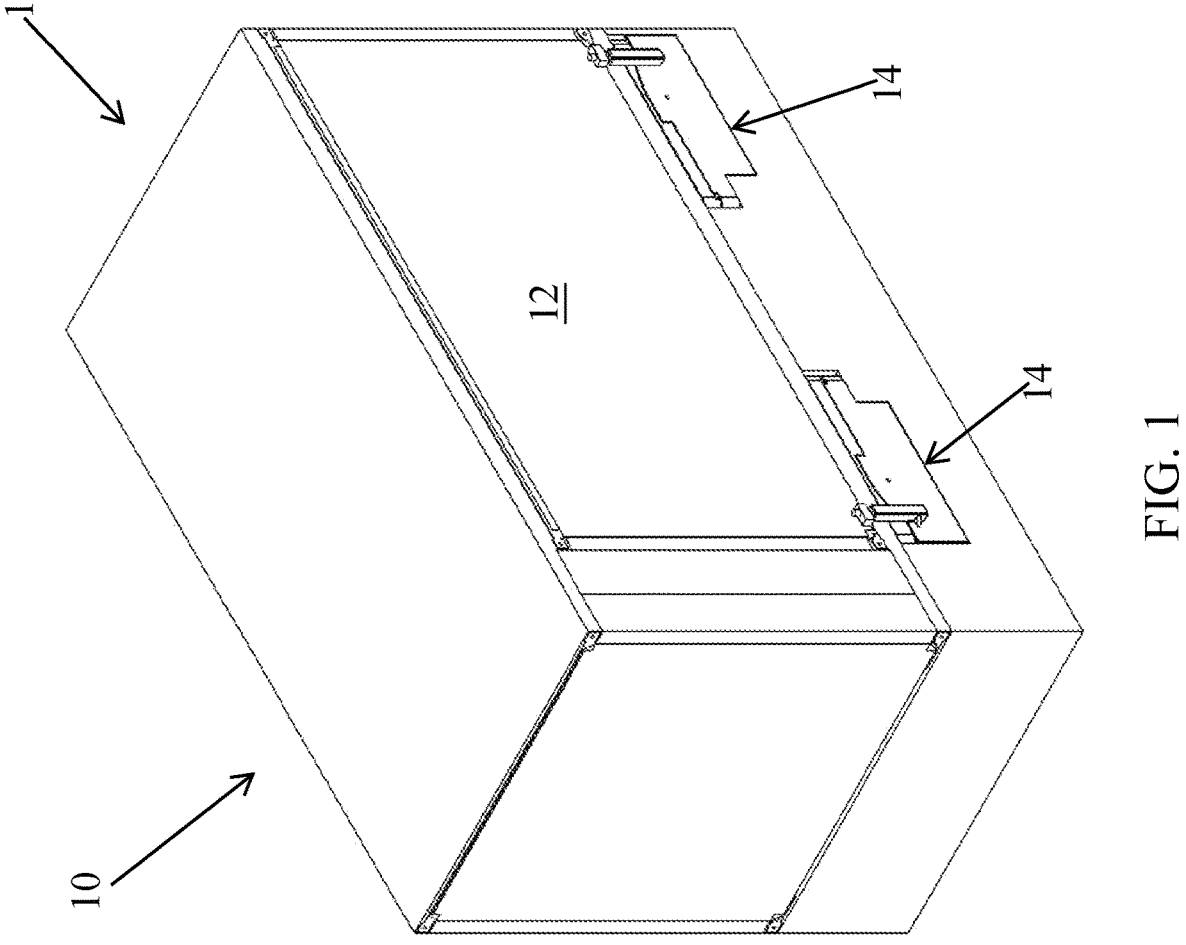
FIG. 1 illustrates a perspective view of an expandable structure with a main structure having an expansion structure in a retracted configuration, according to an exemplary embodiment of the present invention.

The illustrations in the figures may not necessarily be drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE
PREFERRED EMBODIMENTS AND BEST
MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a multilink structure that provides for a stabilizer system for expansion sections of expandable structures, such as for a slide-out of a recreational vehicle. The stabilization system can be securely mounted onto either the chassis or the extension track, offering versatility for different configurations. Due to space constraints on the chassis, the stabilizer is engineered to remain horizontally aligned when retracted, maximizing available space. The primary connection point for the multilink stabilizer system is the chassis structure, with the outer wall attached as a secondary support. During deployment, the outer wall ingeniously combines pushing and rotational forces to smoothly extend the stabilizer assemblies outward. Once fully extended, the stabilizer adopts a fully vertical position, providing vital stability and support for the expansion section or slide-out. The stabilization system can eliminate the need for manual adjustment and alignment, thereby offering users a seamless and hassle-free experience.

As described in greater detail below, the primary components can include a first push are and a second push arm, each possessing distinct functions vital for converting energy from the expansion of wall panels into the rotation of the stabilizers. The first push arm serves as the link between a first support beam and a second support beam. Simultaneously, the second push arm establishes a connection between the first push arm and the stabilizer. Through these interconnected elements, the stabilizer undergoes a transformation from a horizontal orientation to a perpendicular one, all without the need for an additional power source.

Figure 2:
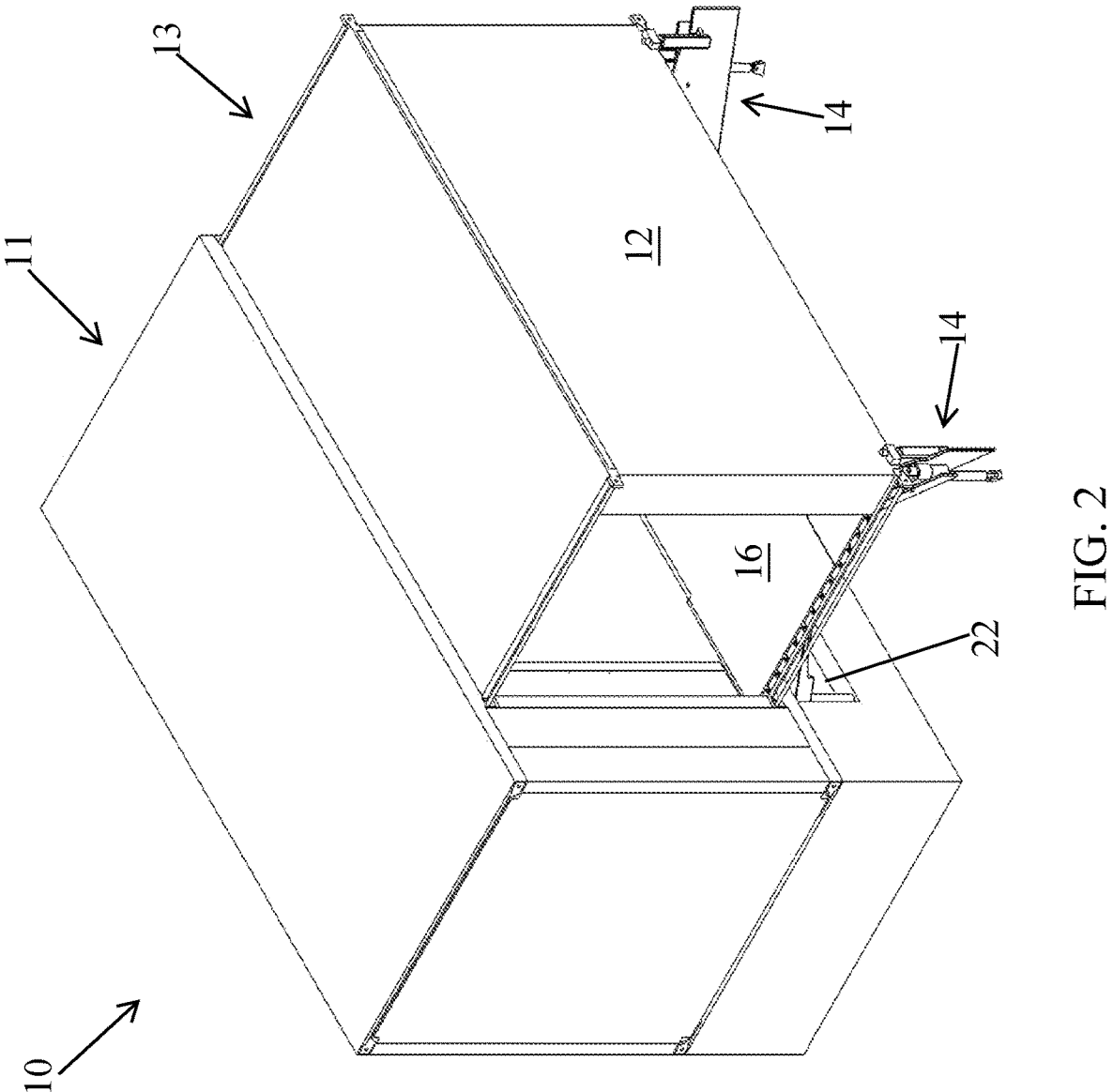
FIG. 2 illustrates a perspective view of the expandable structure of FIG. 1 with the expansion structure in an expanded configuration.
Figure 3:
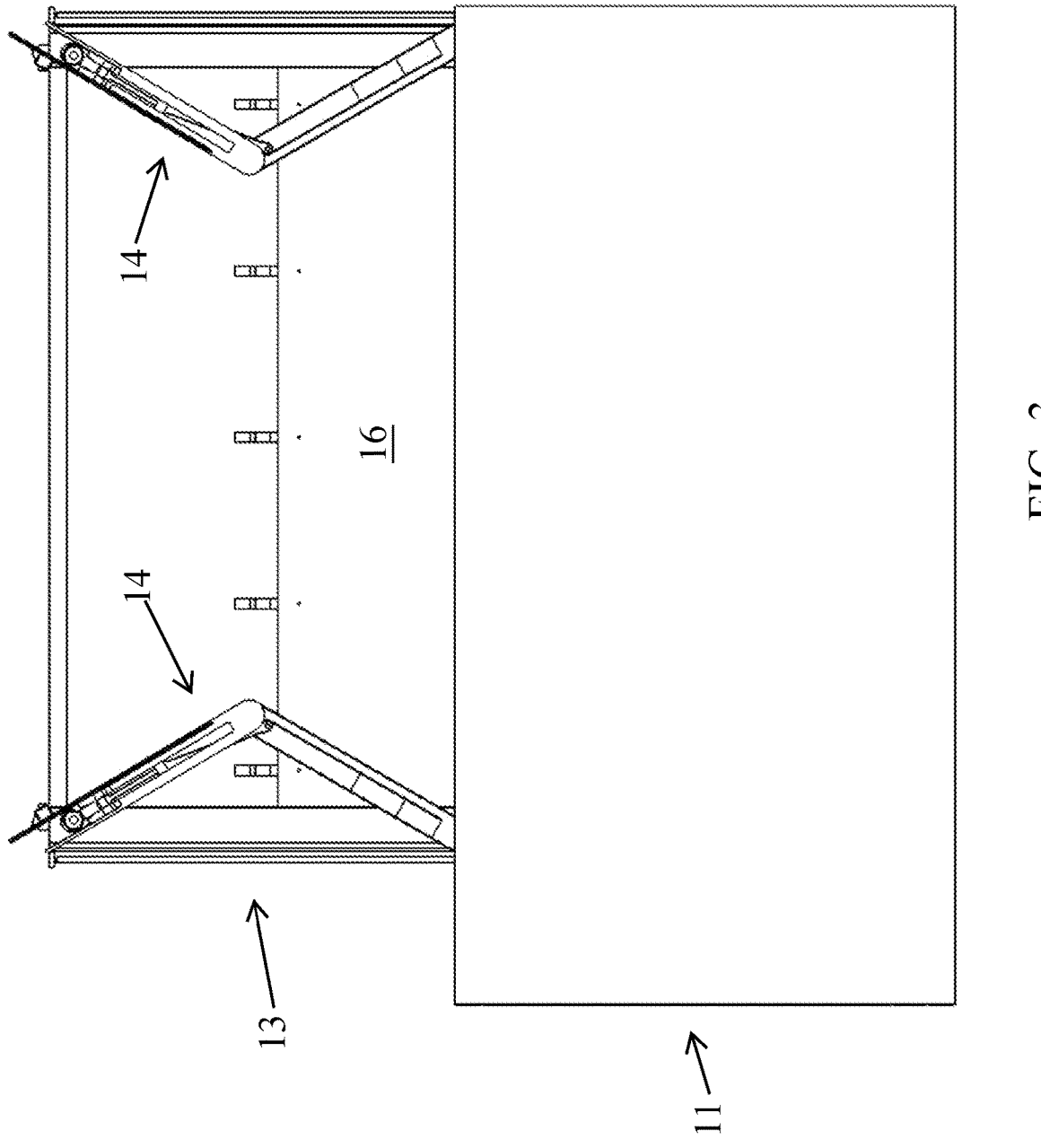
FIG. 3 illustrates a bottom view of the expansion structure of FIG. 2 with the expansion structure in the expanded configuration.
Figure 4:
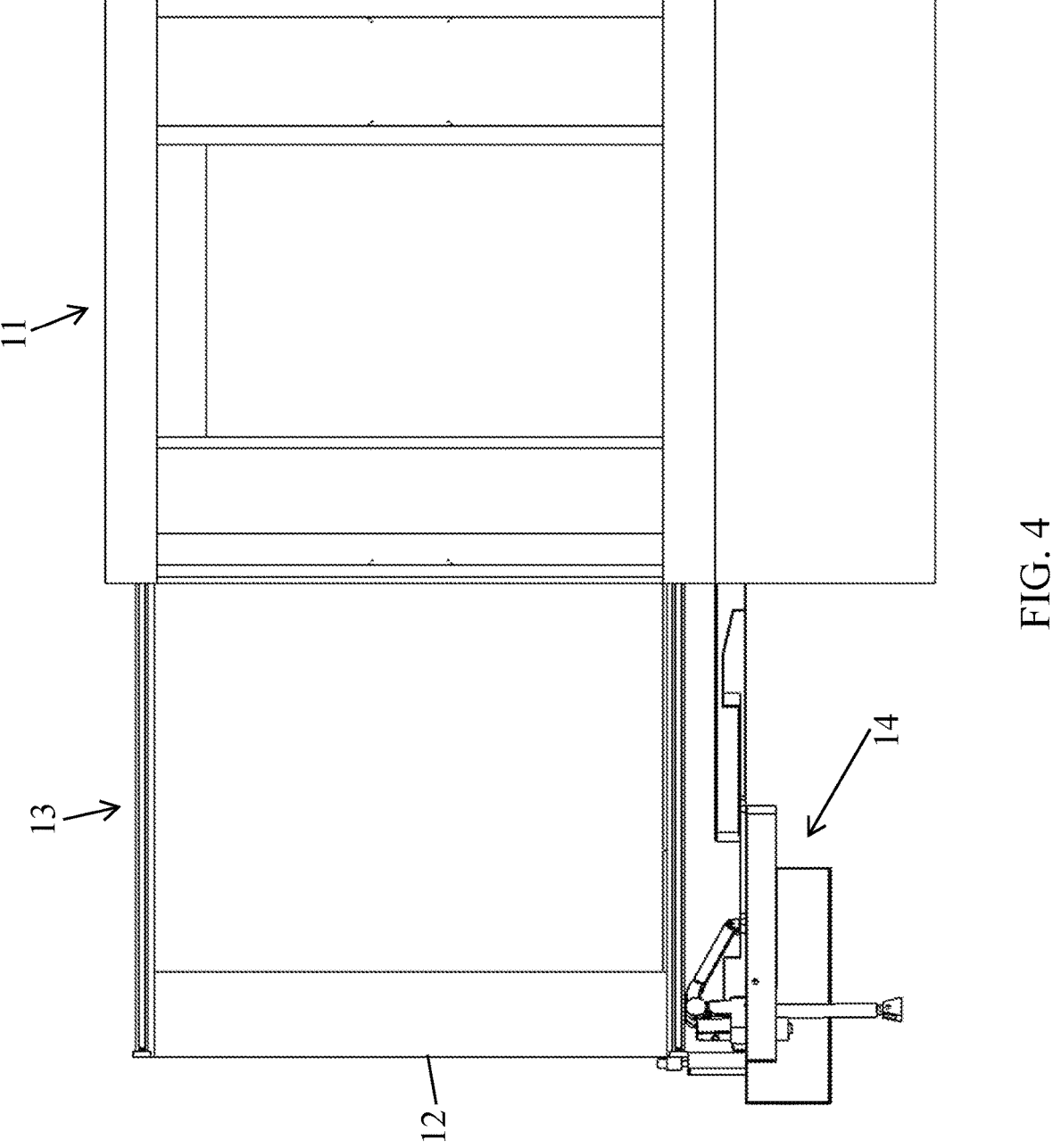
FIG. 4 illustrates a side view of the expansion structure of FIG. 2 with the expansion structure in the expanded configuration.

Referring to FIGS. 1 to 4, an expandable structure 10 includes a main structure 11 and an expansion structure 13. In the retracted state, as shown in FIG. 1, the outer wall 12 of the expansion structure 13 forms the outer wall of the main structure 11. In the expanded state, as shown in FIGS. 2 through 4, the floor 16 may be unfolded in the expansion structure 13 and the outer wall 12 is moved outward, away from the main structure 11.

During expansion of the expansion structure 13, a multilink stabilizer assembly 14 can deploy to provide stabilization of the expansion structure 13 by providing an interconnection between the ground and the outer corners of the expansion structure 13 (as defined by the lower opposite corners of the outer wall 12. In the retracted state, most of the multilink stabilizer assembly 14 can fit into openings 22 formed in the main structure 13, thus permitting the expandable structure 10 to be, for example, part of a recreational vehicle.

Figure 5:
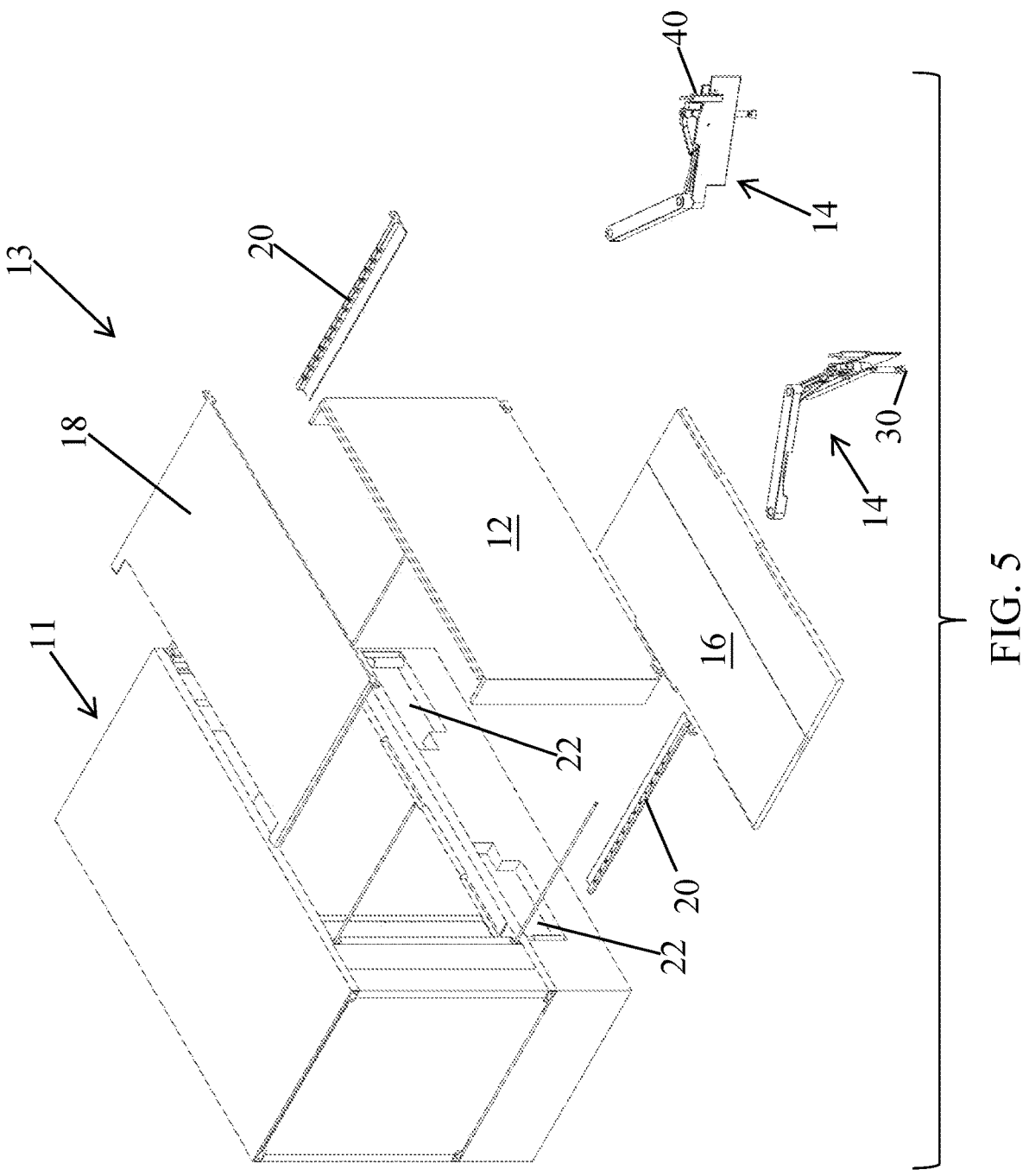
FIG. 5 illustrates an exploded perspective view of the expansion structure of FIG. 2.

Referring to FIG. 5, an exploded view of the expansion structure 13 is illustrated, where the expansion structure 13 can extend on tracks 20, where the tracks 20 push out the outer wall 12, causing the floor 16 to unfold and be deployed and a roof 18 to slide outward. As the expansion structure 13 expands, the multilink stabilizer assembly 14 can extend out of the openings 22 formed in the main structure 11. As discussed in greater detail below, during expansion, the multilink stabilizer assembly 14 may be folded approximately in half within the opening 22 with a connector 40 attached to the outer wall 12. As the outer wall 12 moves away from the main structure 11, the multilink stabilizer assembly 14 can at least partially unfold, causing an actuator assembly 30 to pivot and rotate to move from a generally horizontal configuration (in the retracted state) to a generally vertical configuration (in the expanded state), where the actuator assembly 30 can provide stabilization and support to the expanded end of the expansion structure 13, below the outer wall 12.

Figures 6, 7:
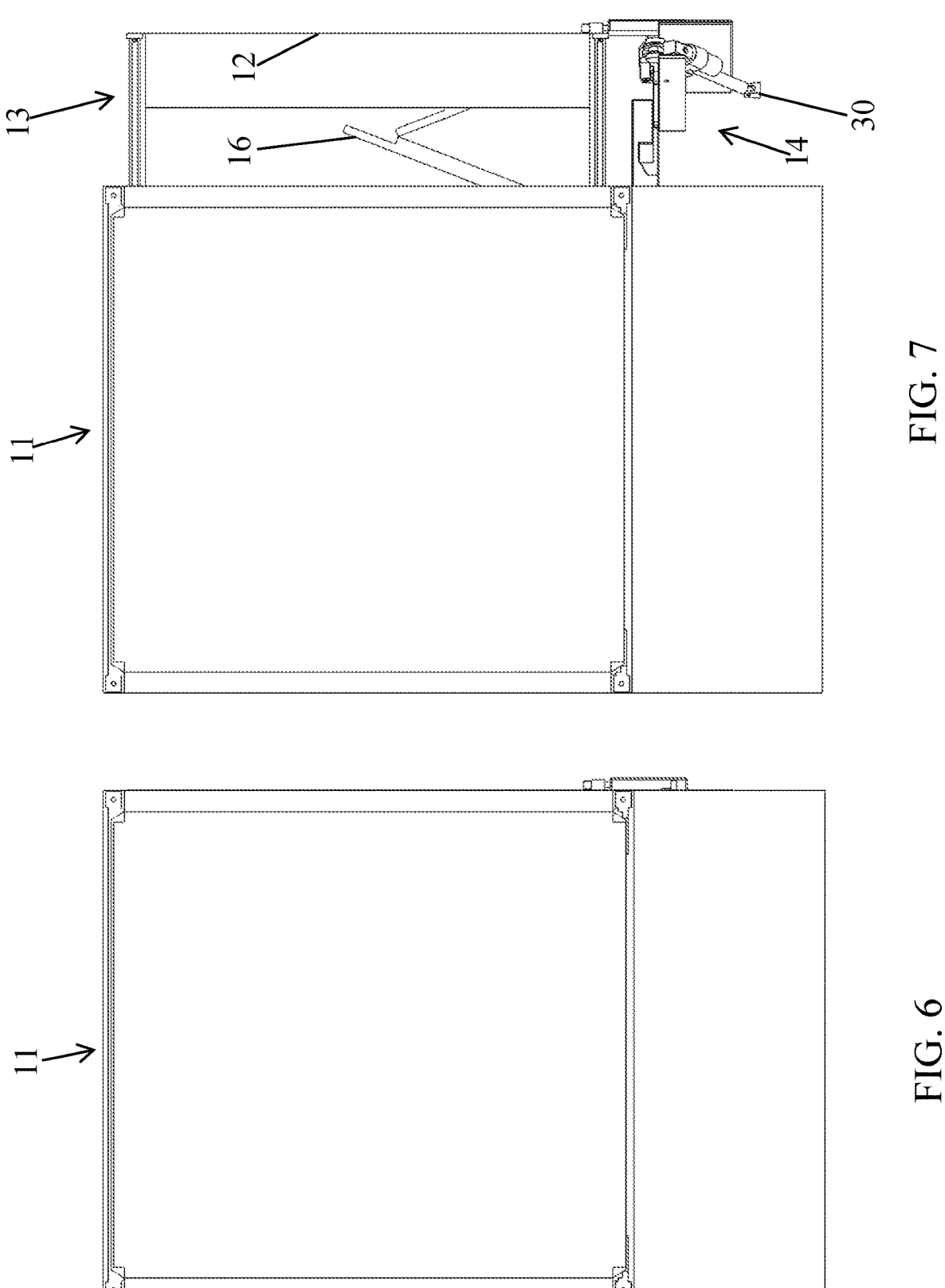
FIG. 6 illustrates a side view of the expandable structure of FIG. 1, in the retracted configuration.
FIG. 7 illustrates a side view of the expandable structure of FIG. 6, with the expansion structure beginning its expansion.
Figure 8:
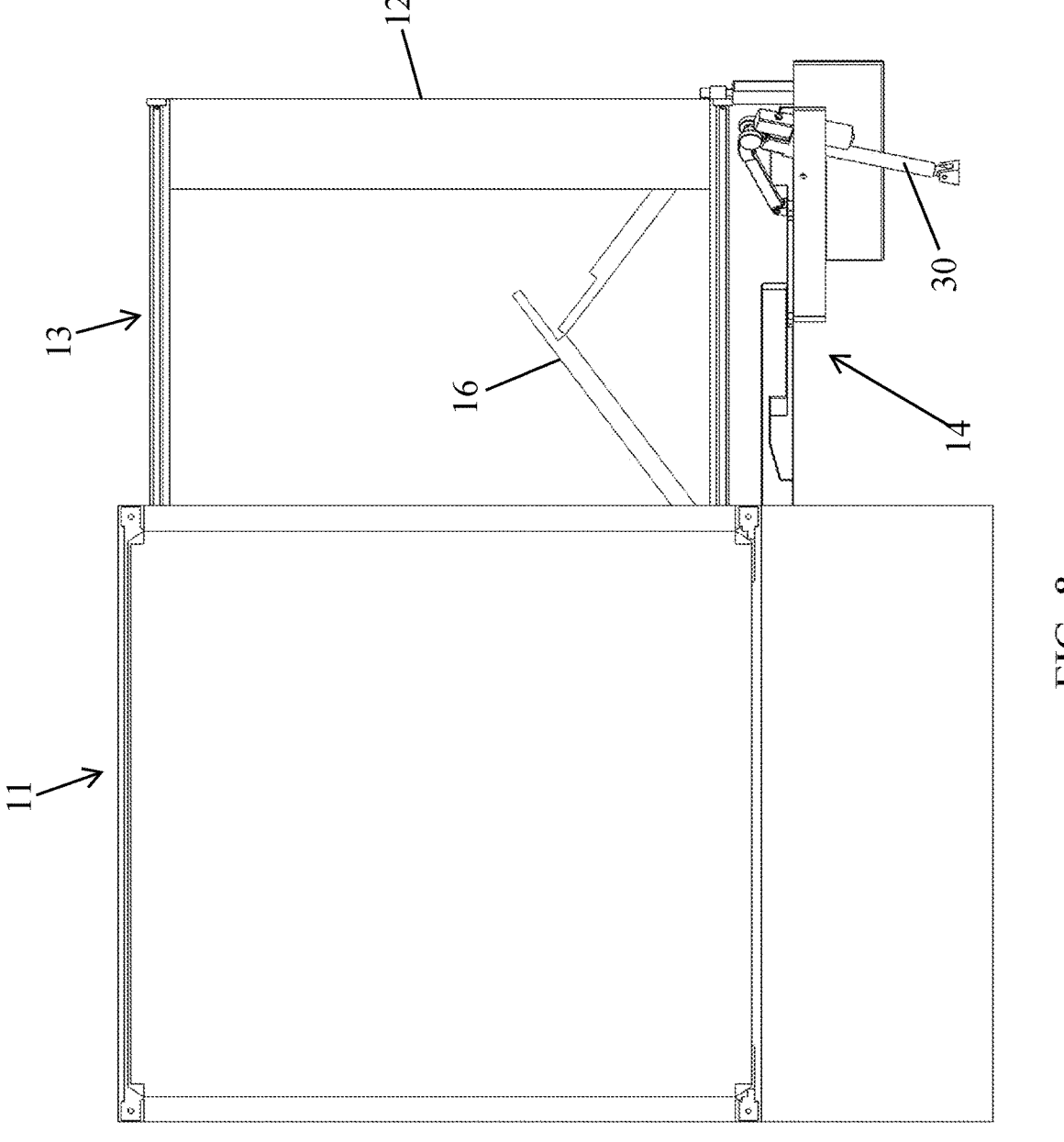
FIG. 8 illustrates a side view of the expandable structure of FIG. 7, with the expansion structure further expanded.
Figure 9:
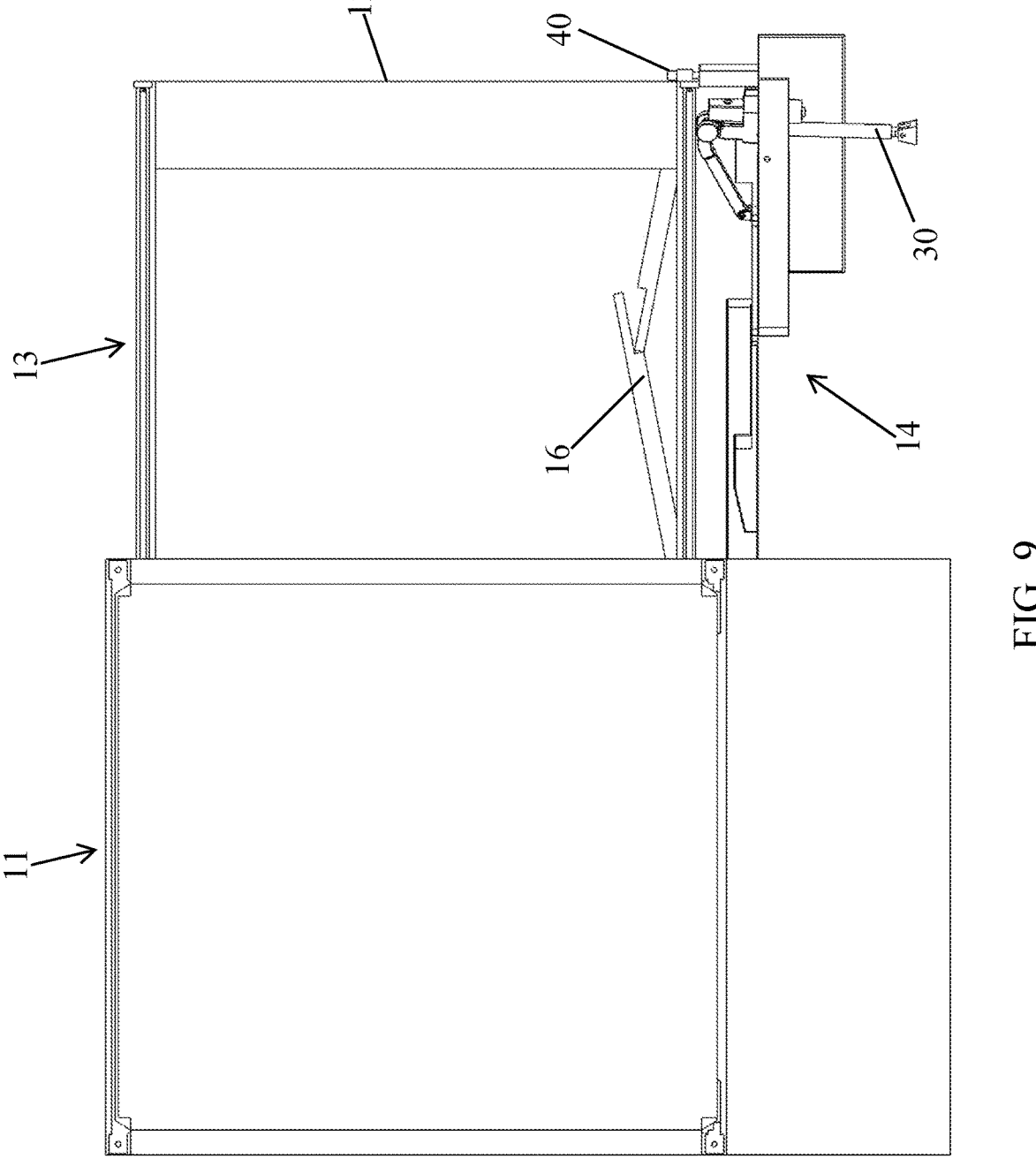
FIG. 9 illustrates a side view of the expandable structure of FIG. 8, with the expansion structure nearly fully expanded.
Figure 10:
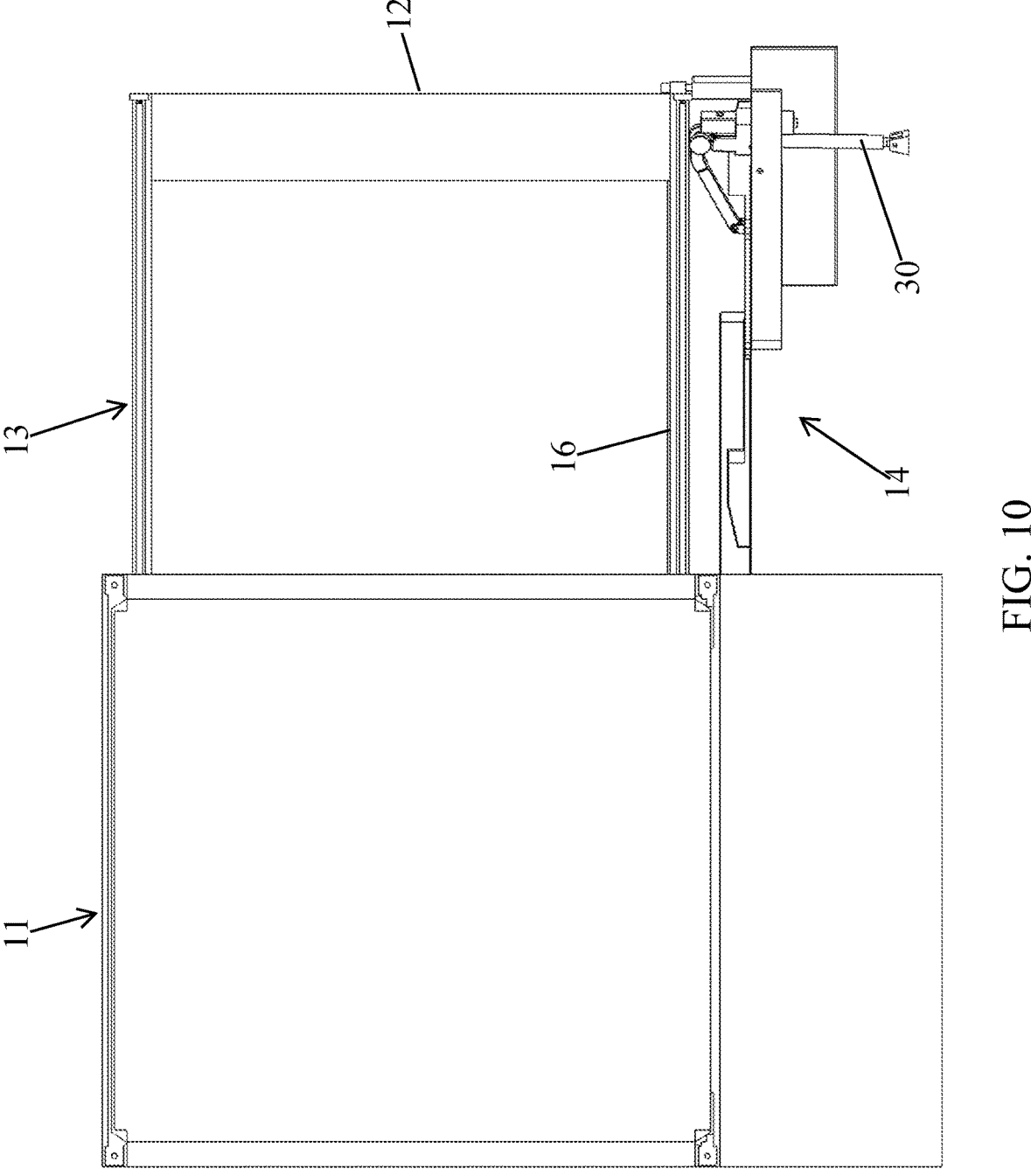
FIG. 10 illustrates a side view of the expandable structure of FIG. 9, with the expansion structure fully expanded.

FIGS. 6 through 10 show a step-wise progression of the expansion structure 13 moving from the retracted state (FIG. 6) to the expanded state (FIG. 10). As the expansion structure 13 moves outward, as shown in FIG. 7 the floor 16 may begin to unfold and the actuator assembly 30 may start to move out of a horizontal orientation, being angled slightly downward (such as about 30 degrees as shown in FIG. 7). As shown in FIG. 8, the expansion process continues with the actuator assembly 30 being nearly vertical as it pivots and rotates toward its expanded position. In FIG. 9, the expansion process is nearly complete, while FIG. 10 shows the expansion structure 13 fully expanded with the actuator assembly being disposed, under the outer wall, at opposite corners thereof, in a substantially, nearly or completely vertical orientation.

Figure 11:
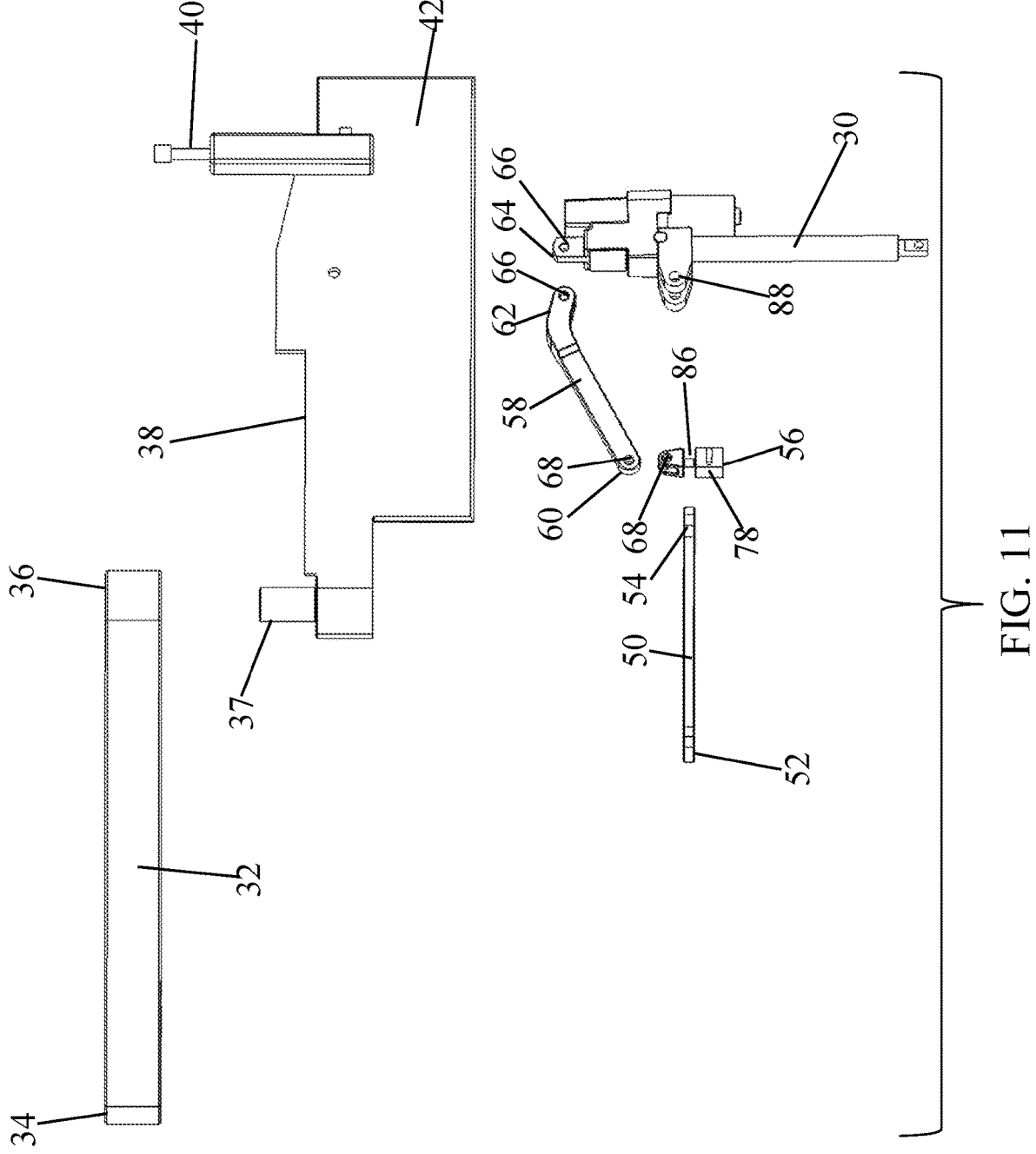
FIG. 11 illustrates an exploded view of a multilink structure used to provide stabilization of the expandable structure of FIG. 1, according to an exemplary embodiment of the present invention.
Figure 12:
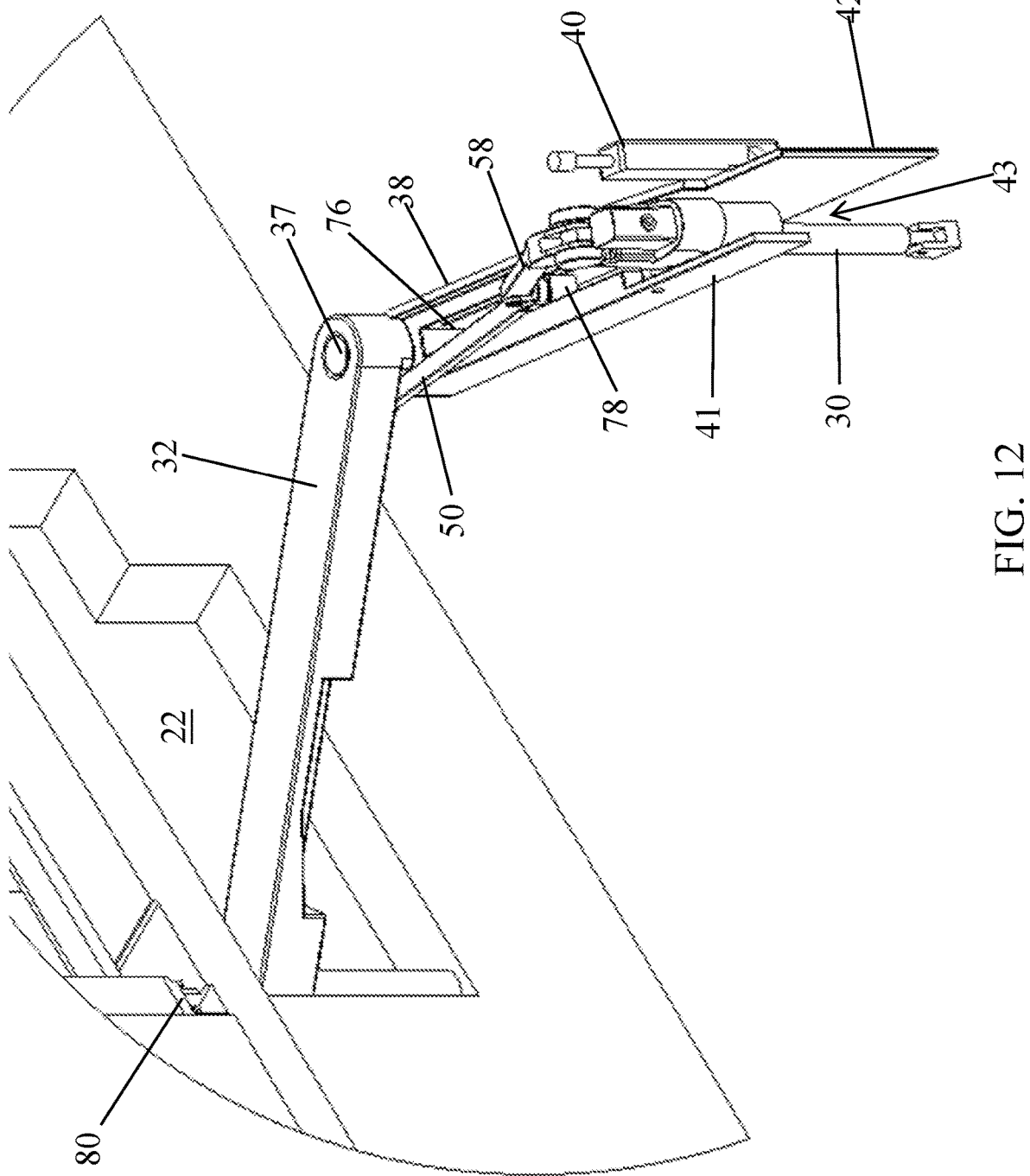
FIG. 12 illustrates a detailed perspective view of the multilink structure of FIG. 11, in an expanded configuration, with the expansion structure removed for clarity.

Referring now to FIGS. 11 and 12, details of the multilink stabilizer assembly 14 are illustrated. A first support beam 32 can have an inner end 34 attached to a structure 80 within the opening 22. The inner end 34 may pivot, generally horizontally, with respect to the structure 80. An outer end 36 of the first support beam 32 can pivotably attach to a pivot connector 37 of a second support beam 38. The second support beam 38 can include an outer support beam body 42 having a connector 40 fixed there to near an outer end thereof. The second support beam 38 can include an inner support beam body 41 that forms a channel 43 with the outer support beam body 42, where the actuator assembly 30 is disposed in the channel 43.

The actuator assembly 30 can rotate as the second support beam 38 rotates during deployment. In the retracted state, the outer support beam body 42 may be generally parallel with a plane defined by the outer wall 12 (see FIG. 1). During expansion, the second support beam 38 can rotate in a generally horizontal rotation plane along a horizontal rotation axis 88. Also during expansion, the actuator assembly 30 can pivot in a pivot plane generally orthogonal to the rotation plane, causing the actuator assembly 30 to move from a generally horizontal orientation when retracted, to a generally vertical orientation when the expansion section is expanded.

Movement of the actuator assembly 30 can be affected by a first push arm 50 interacting with a second push arm 58. The first push arm 50 can include a first connection end 52 that can be attached to the first support beam 32. A second connection end 54 of the first push arm 50 can attach to a push arm adaptor 56 having a base 78 disposed in a channel 36 formed between the outer support beam body 42 and the inner support beam body 41. The base 78 of the push arm adaptor 56 may slide in the channel 36 during expansion and retraction of the expansion structure. A second push arm 58 can pivotably attach to the top of the push arm adaptor 58 at a horizontal pivot axis 68 formed at a first end of the second push arm 58. A second end 62 of the second push arm 58 can include a horizontal pivot axis 66 that connects to a top 64 of the actuator assembly 30. The connection end 54 of the push arm can be attached to the push arm adaptor 56 along a body portion 86 thereof that defines a vertical pivot axis.

Thus, as the multilink stabilizer assembly 14 is deployed (during expansion of the expansion structure), the actuator assembly 30 can be pivoted downward to be generally parallel to a plane of the outer wall 12 (see FIG. 2). The outer planar surface of the second support beam can be angled from about 20 to about 90 degrees relative to the plane defined by the outer wall of the expansion structure, when the expansion structure is in the fully expanded state. In some embodiments, the outer planar surface of the second support beam is angled from about 30 to about 80 degrees relative to the plane defined by the outer wall of the expansion structure, when the expansion structure is in the fully expanded state.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A stabilization structure for a deployed expansion structure of an expandable structure, comprising:

a multilink stabilizer assembly having a first support beam attached to a main structure at a proximate end of the first support beam, a second support beam having a proximate end pivotable about a vertical axis at a distal end of the first beam, a first push arm and a second push arm, wherein the first and second push arms are operable to move an actuator assembly between a horizontal position, when the expansion structure is in a retracted state, to a vertical position, when the expansion structure is in a fully expanded state.

2. The stabilization structure of claim 1, wherein:

a first end of the first push arm is pivotably attached to the first support beam;

a second end of the first push arm is interconnected with a first end of the second push arm; and the second end of the second push arm is pivotably attached to an upper end of the actuator assembly.

3. The stabilization structure of claim 2, further comprising a push arm adaptor having a base slidably engaged in a channel formed in the second support beam, the push arm adaptor being pivotably attached to the second end of the first push arm about a vertical pivot axis, the push arm adaptor being pivotably attached to the first end of the second push arm about a horizontal pivot axis.

4. The stabilization structure of claim 1, wherein the actuator assembly pivots about a horizontal pivot axis between an outer support beam body and an inner support beam body of the second support beam.

5. The stabilization structure of claim 1, further comprising a connector extending from the second support beam, the connector attached to an outer wall of the expansion structure.

6. The stabilization structure of claim 1, wherein the multilink stabilizer assembly fits into an opening formed in the main structure when the expansion structure is in the retracted state.

7. The stabilization structure of claim 6, wherein an outer planar surface of the second support beam is substantially parallel with a plane defined by an outer wall of the expansion structure when the expansion structure is in the retracted state.

8. The stabilization structure of claim 7, wherein the outer planar surface of the second support beam is angled from about 20 to about 90 degrees relative to the plane defined by the outer wall of the expansion structure, when the expansion structure is in the fully expanded state.

9. The stabilization structure of claim 7, wherein the outer planar surface of the second support beam is angled from about 30 to about 80 degrees relative to the plane defined by the outer wall of the expansion structure, when the expansion structure is in the fully expanded state.

10. The stabilization structure of claim 1, wherein first and second ones of the actuator assembly are vertically disposed at opposite corners of the bottom of the outer wall when the expansion structure is in the fully expanded state.

11. A stabilization structure for a deployed expansion structure of an expandable structure, comprising:

a multilink stabilizer assembly having a first support beam attached to a main structure at a proximate end of the first support beam, a second support beam having a proximate end pivotable about a vertical axis at a distal end of the first beam, a first push arm, a second push arm and a connector, wherein the connector extends from the second support beam to attach to an outer wall of the expansion structure;

the first and second push arms are operable to move an actuator assembly between a horizontal position, when the expansion structure is in a retracted state, to a vertical position, when the expansion structure is in a fully expanded state;

a first end of the first push arm is pivotably attached to the first support beam;

a second end of the first push arm is interconnected with a first end of the second push arm;

the second end of the second push arm is pivotably attached to an upper end of the actuator assembly; and the actuator assembly pivots about a horizontal pivot axis between an outer support beam body and an inner support beam body of the second support beam.

12. The stabilization structure of claim 11, further comprising a push arm adaptor having a base slidably engaged in a channel formed in the second support beam, the push arm adaptor being pivotably attached to the second end of the first push arm about a vertical pivot axis, the push arm adaptor being pivotably attached to the first end of the second push arm about a horizontal pivot axis.

13. The stabilization structure of claim 11, wherein the multilink stabilizer assembly fits into an opening formed in the main structure when the expansion structure is in the retracted state.

14. The stabilization structure of claim 13, wherein an outer planar surface of the second support beam is substantially parallel with a plane defined by an outer wall of the expansion structure when the expansion structure is in the retracted state.

15. The stabilization structure of claim 14, wherein the outer planar surface of the second support beam is angled from about 30 to about 80 degrees relative to the plane defined by the outer wall of the expansion structure, when the expansion structure is in the fully expanded state.

16. The stabilization structure of claim 11, wherein first and second ones of the actuator assembly are vertically disposed at opposite corners of the bottom of the outer wall when the expansion structure is in the fully expanded state.

17. A stabilization structure for a deployed expansion structure of an expandable structure, comprising:

a multilink stabilizer assembly having a first support beam attached to a main structure at a proximate end of the first support beam, a second support beam having a proximate end pivotable about a vertical axis at a distal end of the first beam, a first push arm and a second push arm, wherein the first and second push arms are operable to move an actuator assembly between a horizontal position, when the expansion structure is in a retracted state, to a vertical position, when the expansion structure is in a fully expanded state;

a first end of the first push arm is pivotably attached to the first support beam;

a second end of the first push arm is interconnected with a first end of the second push arm;

the second end of the second push arm is pivotably attached to an upper end of the actuator assembly; and the multilink stabilizer assembly fits into an opening formed in the main structure when the expansion structure is in the retracted state.

18. The stabilization structure of claim 17, further comprising a push arm adaptor having a base slidably engaged in a channel formed in the second support beam, the push arm adaptor being pivotably attached to the second end of the first push arm about a vertical pivot axis, the push arm adaptor being pivotably attached to the first end of the second push arm about a horizontal pivot axis.

19. The stabilization structure of claim 17, further comprising a connector extending from the second support beam, the connector attached to an outer wall of the expansion structure.

20. The stabilization structure of claim 17, wherein an outer planar surface of the second support beam is substantially parallel with a plane defined by an outer wall of the expansion structure when the expansion structure is in the retracted state.

\* \* \* \* \*